United States Patent [19]

Ishida et al.

[11] 3,862,112

[45] Jan. 21, 1975

[54] ALKALI EXTRACTION OF MICROBIAL CELLULAR PROTEINS AT HIGH TEMPERATURE

[75] Inventors: Masahiko Ishida; Yoshitaka Oguri; Tadashi Muroi; Norio Shimizu, all of Hitachi, Japan

[73] Assignee: Hitachi, Ltd., Tokyo, Japan

[22] Filed: Sept. 11, 1972

[21] Appl. No.: 287,793

[30] Foreign Application Priority Data

Sept. 10, 1971  Japan.............................. 46-69674

[52] U.S. Cl............ 260/112 R, 195/28 R, 426/364, 426/431
[51] Int. Cl.......... A23j 1/00, A23j 1/18, C07g 7/00
[58] Field of Search ................................ 260/112 R

[56] References Cited
UNITED STATES PATENTS

| | | | |
|---|---|---|---|
| 2,603,630 | 7/1952 | Aries................................... | 260/112 |
| 3,121,665 | 2/1964 | Parfentjev............................ | 424/177 |
| 3,585,179 | 6/1971 | Samejima et al. ................... | 260/112 |
| 3,718,541 | 2/1973 | Kalina............................ | 260/112 X |
| 3,725,075 | 4/1973 | Muroi et al. ..................... | 260/112 X |

OTHER PUBLICATIONS

Chem. Abstracts, Vol. 71, 1969, 111651y, Mitsuda et al.

*Primary Examiner*—Howard E. Schain
*Attorney, Agent, or Firm*—Craig and Antonelli

[57] ABSTRACT

A method of extracting microbial cellular proteins which comprises subjecting an aqueous dispersion containing microbial cells to an extraction in the presence of about 0.1 to about 1% by weight of NaOH or KOH at a temperature of about 100° to about 200° C.

According to this method, microbial cellular proteins can be effectively extracted in high yields.

17 Claims, 2 Drawing Figures

ALKALI EXTRACTION OF MICROBIAL CELLULAR PROTEINS AT HIGH TEMPERATURE

BACKGROUND OF THE INVENTION

1. Field of the Invention

The present invention relates to an improved alkali extraction of microbial cellular proteins and more particularly to a method of extracting microbial cellular proteins which is carried out in the presence of a small amount of a strong alkali substance at relatively high temperatures, whereby the microbial cellular proteins are extracted in high yield.

2. Description of the Prior Art

Microbial cells such as bacteria, yeasts, fungi, algae and protozoa are rich in proteins and are more similar to animal proteins, which are nutrient, than to vegetable proteins. Recently, the microbial cellular proteins have been noticed as an important protein source in view of both quantitative and qualitative significance, and there is now considered an opportunity for utilizing certain microbial cells, in particular petroleum assimilating microbial cells, as a feed stuff. Mass production of the above microbial cells now becomes promising.

Indirect use of such microbial cellular proteins as feed stuff for cattle and fishes, however, is not considered efficient utilization of these proteins, and so direct use of microbial cellular proteins is considered desirable. Since microbial cells are covered with tough cell walls resistant to digestion, accompanied with peculiar odor and coloration, these disadvantages make direct adaption of cells as edible foodstuff for humans difficult.

Microbial cellular proteins even obtained from the same species are considered as a heterogenous mixture of various proteins with different physicochemical properties, as much differentiated from vegetable proteins such as soya-bean casein, or milk casein which have major components with the same properties.

For this reason, the procedures for isolation and purification of the microbial cellular proteins are much more difficult than those adopted in obtaining soya-bean casein and milk casein, a part of which has been run in a commercial scale, and so economical process of producing microbial cellular proteins is desired. In this connection, efficient extraction of microbial cellular proteins is considered an important factor.

In order to isolate microbial cellular proteins from microbial cells in high yield, it is essential to find out a suitable extraction technique. There are known as typical extraction methods two kinds of extraction techniques, one is an alkali extraction and the other is an acid extraction. The former is a method wherein a proper amount of alkali substance is added to a slurry containing the microbial cells and the thus prepared slurry is kept at the room temperature or at slightly higher temperatures, so as to extract microbial cellular proteins from the microbial cells. The latter is an extraction method wherein the microbial cell is subjected to an acidic extraction in the presence of a proper amount of acid substance such as hydrochloric acid.

The conventional alkali extraction has been carried out at relatively low temperatures in the presence of several percents of a strong alkali substance such as sodium hydroxide. It was known that the microbial cellular proteins must be decomposed when heated at high temperatures such as 100° C or higher, and that at such high temperatures the yield of proteins is lowered and proteins with good quality cannot be obtained. In fact, according to the conventional extraction using the high concentration of alkali substance, the extraction temperature of about 50° C was the upper limit, or at the higher temperatures the proteins would be markedly colorated to lose their economical value. In the conventional alkali extraction, heating of the microbial cells for a long time must be avoided. In spite of the fact that the extraction is carried out at low temperatures, the yield was limited to at most 60 to 70%. If a higher yield is desired, the microbial cells have to be pretreated with an acid substance such as hydrochloric acid in order to loosen the hard cell walls whereby microbial cellular proteins would be easily extracted with an alkali extracting agent. This pretreatment, however, increases the production cost of microbial cellular proteins because it requires a large quantity of an acid substance and, furthermore, a large amount of an alkali substance for neutralizing the acid substance used for the pretreatment is necessary.

Even in the conventional acid pretreatment-high alkali extraction the yield was at most 85%, and therefore, the isolation of microbial cellular proteins was unsatisfactory. Further, the conventional high alkali concentration extraction has other disadvantages. For example, a large quantity of acid substance is required for neutralizing the alkali substance after extraction and it is difficult to remove completely the salt formed by neutralization which is an undesirable contaminant in the microbial cellular proteins.

Although acidic extraction might be carried out at high temperatures, according to the inventors' experiments acidic extraction has shown an extraction rate that is completely unsatisfactory, that is, the highest extraction rate is about 50% when applied to microbial cells. This is caused by the fact that an acid substance such as hydrochloric acid can not dissolve all useful proteins, that is, the acid cannot dissolve acidic proteins, unlike the alkali extracting agent.

From the above facts, the alkali extracting agent, especially strong alkali substances, are essential for obtaining microbial cellular proteins in high yields.

SUMMARY OF THE INVENTION

It is an object of the present invention to provide an alkali extraction technique which can extract microbial cellular proteins from microbial cells in high yield by a simple method.

It is another object of the present invention to provide an alkali extraction technique which can markedly reduce the extraction cost whereby the production cost of the microbial cellular proteins is considerably lowered.

It is a further object of the present invention to provide a method of extracting microbial cellular proteins which is performed economically and efficiently.

The present invention provides an alkali extraction of microbial cellular proteins which is carried out in the presence of 0.1 to 1% by weight of a strong alkali substance at a temperature of 100° C to 200° C.

Other objects and features and advantages of the present invention will be apparent from the following detailed description taken in conjunction with the accompanying drawings.

DETAILED DESCRIPTION OF THE INVENTION

The present invention may be applicable to alkali extraction of microbial cells including yeasts, fungi, algae, bacteria, protozoa and mixtures thereof. Preferable yeasts, which assimilate natural gases, paraffins, aromatic hydrocarbons and other hydrocarbons, are those belonging to Candida and genus Torulopsis. Also bacteria belonging to genus Pseudomonas, genus Metanomonas and genus Micrococcus may be used. Other usable yeasts are such as genus Saccharomyces which assimilate sugars, organic acids, alchols or other non-hydrocarbon compounds. Bacteria such as genus Bacillus and genus Escherchia are also usable. Algae such as chlorella and protozoa such as paramecium are usable for the present invention. Either wet or dry cells can likewise be employed. The microbial cells which assimilate hydrocarbons are preferred.

A suitable amount of the microbial cells is dispersed in water or other aqueous media. In view of extraction efficiency, 6 to 15% by weight of microbial cells are preferably dispersed in an aqueous medium. To the dispersion thus prepared is added about 0.1 to about 1% by weight of a strong alkali substance to adjust a pH value of the aqueous dispersion to about 9.5 to about 13.5. It has been found that among the strong alkali substances sodium hydroxide and potassium hydroxide are suitable for obtaining a high yield. In particular, sodium hydroxide is the most useful extracting agent because of low cost.

The present inventors have found the fact that the addition of about 0.1 to 1% the strong alkali substance increases the yield of proteins when the microbial cellular proteins are separated from an extract by an isoelectric point precipitation method, which the inventors consider the most effective separating technique. This will be explained in the following taken in conjunction with FIG. 1.

Figure 1:
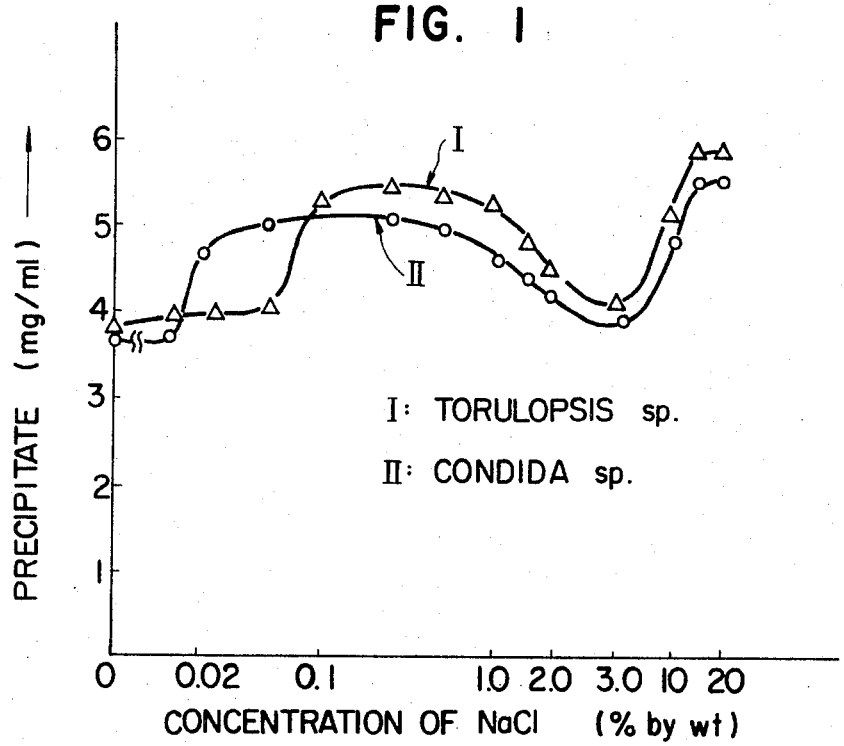
FIG. 1 is a graph showing the relationship between an amount of precipitated proteins and a concentration of sodium chloride in an extract.

When a large quantity of a salt such as NaCl is present in an extract containing microbial cellular proteins, redissolution of proteins takes place due to the effect of dissolution by the salt, i.e. an effect of salting-in, so that the yield of proteins is lowered as shown in FIG. 1 wherein the salting-in effect is found within a range of about 2 to about 10% of salt concentration.

In addition thereto, it is very difficult to completely purify or desalt the microbial cellular proteins in a reasonable period of time, if the extract contains a large quantity of the salt, even when the isoelectric point precipitation is employed. Therefore, it is concluded that about 2 to 10% of salt concentration in the extract should be avoided.

On the other hand, as is seen from FIG. 1 about 0.02 to about 1% of neutral salt facilitates the precipitation of the proteins compared with the case where no salt in present in an extract. The above mentioned phenomena have been observed commonly to almost all the microbial cellular proteins.

From the above facts, it is concluded that about 0.02 to 1% weight of a neutral salt present in an extract is useful for isolating microbial cellular proteins from the extract in high yield.

In the light of the above facts, it is possible to isolate microbial cellular proteins in high yields by the present invention which employs 0.1 to 1% by weight of an alkali substance that forms about 0.15 to about 1.5% by weight of a neutral salt by neutralization and, therefore, such the neutral salt increases the yield of proteins when the extract is subjected to isoelectric point precipitation.

When the alkali substance added is less than 0.1% by weight the extraction effect is not sufficient so that extraction must be continued for remarkably long time. To the contrary, when the alkali concentration in the extract solution is larger than 1% by weight, the microbial cellular proteins are markedly colorated since the extraction according to the present invention is carried out at a temperature of 100° to 200° C.

Although extraction by low alkali concentration can be effected at temperatures lower than 100° C, the extraction at such low temperature takes a long time for sufficiently extracting microbial cellular proteins. According to the present inventors' experiments, extraction can be performed effectively at about 120° to about 200° C.

The alkali extraction according to the present invention is, of course, carried out under pressure in an autoclave or any other suitable pressure vessels or apparatus because the aqueous dispersion or slurry is heated at a temperature higher than 100° C.

An amount of sodium hydroxide required to adjust a pH value of the slurry containing 10% by weight of microbial cells at 10 to 13 is about 0.5% by weight, and consequently, the salt concentration formed in the extract by neutralization with hydrochloric acid becomes about 0.73% by weight. This salt concentration is favorable for the isoelectric point precipitation. For the sake of better understanding of the present invention, there is disclosed in the following the relations between pH values and temperatures with respect to the extraction of microbial cells of *Candida lipolytica* and *Torulopsis* sp.

As mentioned already, 9.5 to 13.5 of pH value is suitable for the present invention. When the pH value is larger than 13.5, the yield of proteins will be lowered owing to hydrolyzation thereof. The pH value of 9.5 is the lower limit at which the microbial cellular proteins can be extracted effectively. When the pH value is the same, the higher the extracting temperature, the shorter the extracting time required for extracting proteins in a yield of larger than 70%. Brown coloration of the proteins depends upon the pH value rather than on the temperature and the heating time. The coloration becomes markedly when the pH is higher than 13.5.

The present invention is very economical because the quantities of alkali substance and acid substance for neutralizing the alkali are extremely small. That is, in the present invention, the quantity of acid required for neutralization is only one fifth to one twentieth, because acidic substances such as organic acids and other component having buffer action, such as amino acids are extracted from microbial cells, concurrently with the proteins. In the conventional high alkali concentration extraction, since the alkali concentration is too high to be sufficiently reduced by acidic substances formed by extraction, a large quantity of the acid substance for neutralizing alkali is required. To the contrary, in the present invention, a quantity required for neutralization is very small because an amount of the alkali substance used is small and the alkali is consumed effectively by the acidic substances formed by extraction.

The present invention will be further understood from the following examples:

EXAMPLE 1

One kilogram of dried *Candida lipolytica*, which is a yeast capable of assimilating petroleum, was dispersed in 9.95 liters of an alkali solution in which 44 grams of sodium hydroxide (0.4% by weight) was dissolved, whereby a pH value of the dispersion was adjusted to 12.0.

The dispersion was charged in an autoclave and heated at 120° C for 10 minutes with stirring so as to carry out alkali extraction. During the extraction, the pressure of the autoclave was kept at 4 Kg/cm$^2$.

After cooling the dispersion, 16 milliliters of conc. hydrochloric acid was added to the dispersion to neutralize the alkali (NaOH), and an extract was separated by centrifugation therefrom. The extraction rate was 85%. The extract was then subjected to an isoelectric point precipitation after conc. hydrochloric acid was added to the extract to adjust the pH value to the isoelectric point 4.2 so that desired proteins were precipitated. The white precipitate collected was washed once with water and thereafter dried to obtain 391 grams (protein yield 75%) of purified microbial cellular proteins of 91% purity, white and colorless.

EXAMPLE 2

100 grams of dried *Candida lipolytica* was dispersed in 900 milliliters of 0.4% sodium hydroxide aqueous solution to provide a pH value of 12.0. The prepared dispersion was divided into nine samples and each sample was charged in an autoclave and heated at the temperatures shown in Table 1 with stirring to carry out the extraction. In order to determine the accurate extraction rates, each of the dispersions was rapidly cooled with water after the extraction had finished. Extracts were separated by centrifugation from the rest of the dispersions.

The extracting rates are shown in Table 1, wherein $T_1$ is the time required until the temperature of the dispersion reaches the preset temperature, and $T_2$ is the time kept at the preset temperature.

Table 1

| | Preset Temp. (°C) | $T_1$ (min.) | $T_2$ (min.) | Extraction rate (%) |
|---|---|---|---|---|
| 1 | 120 | 15 | 0 | 42 |
| 2 | do. | do. | 10 | 83 |
| 3 | do. | do. | 20 | 88 |
| 4 | 135 | 20 | 0 | 67 |
| 5 | do. | do. | 10 | 85 |
| 6 | do. | do. | 0 | 82 |
| 7 | 150 | 27 | 5 | 86 |
| 8 | do. | do. | 10 | 83 |
| 9 | do. | do. | 15 | 80 |

In Table 1, the extracting rates were determined by a colorimetric analysis of a Biuret reaction wherein the extract was subjected to dialysis against water and the resulting dialyzate was subjected to the above analysis. The extraction rates include the proteins contained in an extract which wets the extracting lees.

EXAMPLE 3

With respect to five kinds of microbial cells, the results shown in Table 2 were obtained in accordance with the same manner as in Example 1.

In the experiments, the extraction temperature was 150° C, the extraction time 10 minutes and a cell content of each slurry 10% by weight.

Table 2

| Microbial cells | pH | Extraction rate (%) | Purity (%) | Yield (%) |
|---|---|---|---|---|
| *Torulopsis sp.* (petroleum yeast) | 11.5 | 90 | 78 | 91 |
| *Torula sp.* (sulphite pulp waste yeast) | 12.5 | 82 | 70 | 84 |
| *Saccharomyces cervisiae* (bread yeast) | 12.5 | 85 | 72 | 90 |
| *Pseudomonas sp.* (hydrocarbon assimilating bacteria) | 12.0 | 91 | 75 | 92 |
| *Bacillus subtilus* | 12.5 | 85 | 68 | 88 |

EXAMPLE 4

100 grams of *Candida lipolytica* (protein content 52%) was dispersed in 900 milliliters of each of different alkali solutions of pH 10.5. Each dispersion was charged in an autoclave and heated with stirring in an oil bath and kept at 170° C for 17 minutes.

After heating had finished, the dispersions were cooled by running water to 40° C. To the cooled dispersions was added conc. hydrochloric acid to neutralize the alkali substances, and extracts were separated by centifugation from dispersions. To each of the extracts was added conc. hydrochloric acid with stirring to adjust a pH value to the isoelectric point 4.2 to 4.3.

The resulting white proteins precipitated were gathered and washed once with water and then dried to obtain light yellowish protein powder. The results are shown in Table 3 below.

Table 3

| Alkali substance | Amount of alkali (% by weight) | Extraction rate (%) | Yield (%) | Purity (%) |
|---|---|---|---|---|
| NaOH | 0.28 | 100 | 72 | 90 |
| KOH | 0.52 | 75 | 54 | 89 |
| Na$_2$CO$_3$ | 2.9 | 36 | 26 | 90 |
| K$_2$CO$_3$ | 4.0 | 37 | 25 | 90 |

As is seen from Table 3, among strong alkali substances, sodium hydroxide and potassium hydroxide are excellent in extraction rate and yield.

EXAMPLE 5

A. Comparative Run

To 108 g of dried *Candida lipolytica* (dried matter 100 g, protein content 51%) was added 366 milliliters of water and 17.4 milliliters of conc. hydrochloric acid of 11.5 N to prepare a slurry. The slurry was cycled and heated at 100° C for 20 minutes to cause the microbial cells to be pretreated with acid.

After the pretreatment had finished, the slurry was cooled with water, and 140 milliliters of sodium hydroxide aqueous solution in which 28.05 grams of sodium hydroxide was dissolved was added to the slurry and alkali extraction was carried out at 35° C for 1 hour with stirring. Thereafter, to the slurry was added 1332 milliliters of water and stirred for a short time. To the slurry so diluted was further added 35 milliliters of conc. hydrochloric acid so as to neutralize the sodium hydroxide; the extraction rate 95%.

After the extract was separated by centrifugation from the slurry, the extract was subjected to gel-filteration by passing through a gel-filtering column packed with a gel-filtering material (Sephadex G-25, manufactured by Pharmacia Co. in Sweden), whereby only protein fractionation was collected.

To the resulting protein fractionation was added conc. hydrochloric acid to adjust a pH value to the isoelectric point 4.25 so as to precipitate the microbial cellular proteins in the extract. The proteins precipitated were separated by centrifugation, then washed and dried to obtain 36 grams of slightly yellowish protein powder (91% purity).

B. Inventive Run

To 108 grams of the same cells as in the above run (A) was added 15 milliliters of 30% sodium hydroxide solution and 886 milliliters of water to prepare a slurry of pH value of 11.5. The final NaOH concentration was 0.4%.

The resulting slurry was charged in an autoclave and heated at 160° C for 5 minutes with stirring to carry out alkali extraction (extraction rate 99%). After the extraction had finished, the slurry was rapidly cooled with water. In this step, the pH value was changed to 11.0 to 9.7 because acidic substances were extracted concurrently with proteins from the microbial cells.

To the slurry was added 9 milliliters of 9N hydrochloric acid to adjust a pH value to 7 and, thereafter, an extract was separated by centrifugation from the slurry. To the extract obtained was added 8 milliliters of 4N hydrochloric acid to adjust a pH value to the isoelectric point 4.2 to 4.3 thereby precipitating proteins.

The proteins precipitated were dried to obtain 35 grams of slightly yellowish white protein powder (purity 90%).

As apparent from comparing the above run (A) with (B), the quantity of sodium hydroxide is reduced to one fourth to one fifth and of the hydrochloric acid is reduced to one twentieth compared with the conventional alkali extraction.

EXAMPLE 6

To each of five kinds of sodium hydroxide aqueous solutions was added 100 grams of dried petroleum assimilating yeast belonging to *Candida* sp. A proper amount of water was further added to each of the slurries so as to prepare five kinds of slurries of which final NaOH concentrations were ranging between 0.2 and 0.6% by weight (pH 10 to 12) and a cell concentration was 10%.

Figure 2:
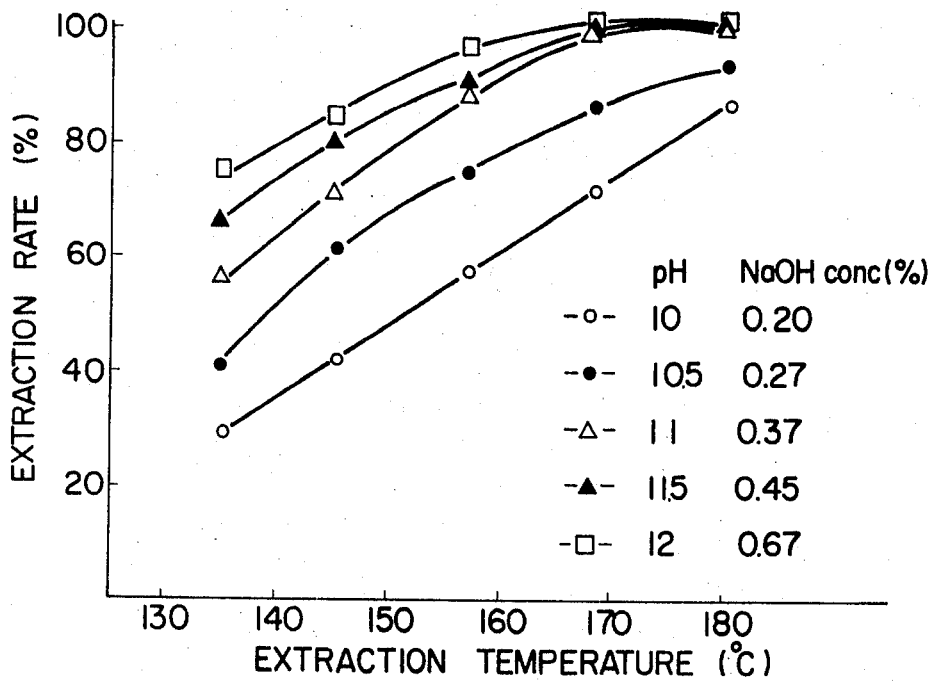
FIG. 2 is a graph showing the effects of extracting temperatures on extraction rates at different pH values.

Each slurry was subjected to alkali extraction in an autoclave at temperatures shown in FIG. 2. The slurry was cooled with cold water just after the extraction had finished and then subjected to centrifugation to separate an extract.

Extraction rates with respect to respective slurries were determined, and these rates are shown in FIG. 2. As can be seen from FIG. 2, the higher the alkali concentration, i.e. the pH value, and the extraction temperature, the higher the extraction rate will be obtained.

EXAMPLE 7

To 26.4 grams (dried matter 25 grams) of dried petroleum assimilating yeast belong to *Candida* sp. were added 1.9 milliliters of 39% sodium hydroxide aqueous solution and 222 milliliters of water so as to prepare a slurry having a final NaOH concentration of 0.27% by weight (pH 10.5). 15 samples each having the same composition as mentioned above were prepared.

Each sample was subjected to alkali extraction at different temperatures shown in Table 4, and then cooled with cold water after the extraction had finished. Extracts were separated by centrifugation from the slurries.

The extraction rates were determined and are shown in Table 4.

Table 4

| No. | Extraction temp.(°C) | $T_1$ (min.) | $T_2$ (min.) | $T_3$*(min.) | Extraction rate (%) |
|---|---|---|---|---|---|
| 1 | 70 | 4 | 0 | less than 4 | 20 |
| 2 | do. | do. | 30 | do. | 24 |
| 3 | 157 | 15 | 0 | do. | 74 |
| 4 | do. | do. | 5 | do. | 82 |
| 5 | do. | do. | 10 | do. | 94 |
| 6 | do. | do. | 30 | do. | 90 |
| 7 | 167 | 16 | 0 | do. | 87 |
| 8 | do. | do. | 5 | do. | 92 |
| 9 | do. | do. | 10 | do. | 100 |
| 10 | do. | do. | 30 | do. | 87 |
| 11 | 180 | 18 | 0 | do. | 93 |
| 12 | do. | do. | 5 | do. | 100 |
| 13 | do. | do. | 10 | do. | 100 |
| 14 | do. | do. | 30 | do. | 80 |
| 15 | 195 | 20 | 5 | do. | 100 |

*Time required for cooling a slurry from Extraction temp. to 40°C.

As having disclosed, according to the present invention, microbial cellular proteins can be extracted in high yield by a very economical method, without pretreating the microbial cells. However, the raw microbial cells can be pretreated with a suitable acidic substance, if desired.

It will be appreciated other precipitation methods may be used to separate the proteins from the extract. Among these other methods are heavy metal precipitation using calcium hydroxide or calcium chloride, salting-out using a large quantity of ammonium sulfate or sodium chloride, the salts being removed after precipitation to purify the proteins; and solvent precipitation using organic solvents such as ethanol, acetone, or tetrahydrofuran.

What is claimed is:

1. A method of extracting microbial cellular proteins which comprises subjecting an aqueous dispersion containing microbial cells to extraction in the presence of about 0.1 to about 1% by weight of an extracting agent consisting essentially of an alkali substance selected from the group consisting of sodium hydroxide, potassium hydroxide, and mixture thereof at a pH of about 9.5 to about 13.5 and at a temperature of about 120° to about 200° C. and separating microbial cellular proteins from the resulting extract.

2. A method of extracting microbial cellular proteins which comprises preparing an aqueous dispersion containing microbial cells and about 0.1 to about 1% by weight of an extracting agent consisting essentially of a strong alkali substance selected from the group consisting of sodium hydroxide, potassium hydroxide and mixture thereof so that a pH value of the dispersion is adjusted to about 9.5 to about 13.5, heating the dispersion at a temperature of about 120° to about 200° C. and recovering microbial cellular proteins from the resulting extract.

3. A method of extracting microbial cellular proteins which comprises preparing an aqueous dispersion containing about 5 to about 15% by weight of microbial cells, adding about 0.1 to about 1% of an extracting agent consisting essentially of a strong alkali substance selected from the group consisting of sodium hydroxide, potassium hydroxide and mixture thereof to the dispersion and thereby adjusting the pH of said dispersion to about 9.5 to about 13.5, heating the dispersion at a temperature of about 120° to about 200° C. and recovering microbial cellular proteins from the resulting extract.

4. A method of extracting microbial cellular proteins which comprises preparing an aqueous slurry of microbial cells selected from the group consisting of yeast, fungi, algae, bacteria, protozoa, and mixtures thereof, adding about 0.1 to about 1% by weight of an extracting agent consisting essentially of an alkali substance selected from the group consisting of sodium hydroxide, potassium hydroxide, and mixture thereof so that a pH value of the slurry is adjusted to about 9.5 to about 13.5, heating the slurry to a temperature of about 120° to about 200°.C. for the period of time unitl the extracting rate of the microbial cellular proteins exceeds about 70%, and recovering microbial cellular proteins from the resulting extract.

5. A method of recovering microbial cellular proteins which comprises preparing an aqueous dispersion containing raw microbial cells, adding about 0.1 to about 1 percent by weight of an extracting agent consisting essentially of a strong alkali substance selected from the group consisting of sodium hydroxide, potassium hydroxide and mixture thereof to the dispersion so that a pH value of the dispersion is adjusted to about 9.5 to about 13.5, heating the dispersion to a temperature of about 120° to about 200° C. for the period of time until the extraction rate of the microbial cellular proteins exceeds about 70%, and separating the microbial cellular proteins from the resulting extract.

6. The method of claim 5, wherein the microbial cellular proteins are separated by subjecting the extract to isoelectric point precipitation.

7. A method of recovering microbial cellular proteins which comprises preparing an aqueous slurry containing about 5 to about 15% by weight of raw microbial cells selected from the group consisting of yeasts, fungi, algae, bacteria, protozoa, and mixtures thereof and about 0.1 to about 1% by weight of an extracting agent consisting essentially of a strong alkali substance selected from the group consisting of sodium hydroxide, potassium hydroxide and mixture thereof so that a pH value of the slurry is adjusted to about 9.5 to about 13.5, heating the slurry at a temperature of about 120° to about 200° C. for the period of time until the extraction rate exceeds about 70%, neutralizing the slurry, subjecting the slurry to centrifugation so as to separate an extract, and separating microbial cellular proteins from the extract.

8. A method of recovering microbial cellular proteins which comprises preparing an aqueous slurry containing about 5 to about 15% by weight of raw microbial cells selected from the group consisting of yeasts, fungi, algae, bacteria, protozoa and mixtures thereof and from about 0.1 to about 1% by weight of an extracting agent consisting essentially of a strong alkali substance selected from the group consisting of sodium hydroxide, potassium hydroxide, and mixtures thereof, said slurry having a pH of about 9.5 to about 13.5, heating the slurry at a temperature of about 120° to about 200° C. for the period of time until the extraction rate of the microbial cellular proteins exceeds about 70%, neutralizing the slurry, subjecting the slurry to centrifugation so as to separate an extract from the slurry, precipitating the microbial cells from the extract, and separating the resulting precipitate from the extract.

9. The method of claim 8, wherein the slurry is neutralized to the isoelectric point of proteins contained within said microbial cells.

10. A method of extracting microbial cellular proteins which comprises subjecting an aqueous dispersion containing raw microbial cells selected from the group consisting of bacteria, yeasts, fungi, algae, protozoa, and combinations thereof to an extraction at a temperature of about 120° to about 200° C in the presence of about 0.1 to about 1% by weight of extracting agent consisting essentially of an alkali substance selected from the group consisting of sodium hydroxide, potassium hydroxide, and mixture thereof so that a pH value of the dispersion is adjusted to about 9.5 to about 13.5, the extracting being carried out until the extracting ratio exceeds 70% and thereafter recovering microbial cellular proteins from the resulting extract.

11. The method of claim 10, wherein the cellular proteins are recovered from the resulting extract by isoelectric point precipitation.

12. The method of claim 1, wherein the microbial cells are selected from the group consisting of yeasts, fungi, algae, bacteria, protozoa and mixtures thereof.

13. The method of claim 2, wherein the microbial cells are selected from the group consisting of yeasts, fungi, algae, bacteria, protozoa and mixtures thereof.

14. The method of claim 3, wherein the microbial cells are selected from the group consisting of yeasts, fungi, algae, bacteria, protozoa and mixtures thereof.

15. The method of claim 5, wherein the microbial cells are selected from the group consisting of yeasts, fungi, algae, bacteria, protozoa and mixtures thereof and said aqueous dispersion contains from about 5 to about 15% by weight of said microbial cells.

16. The method of claim 7, wherein the slurry is neutralized by the addition of hydrochloric acid to form a neutral salt within said slurry.

17. The method of claim 9, wherein the slurry is neutralized by the addition of hydrochloric acid to adjust the pH of the slurry to 4.2 to 4.3.

* * * * *